(12) United States Patent
Moritomo

(10) Patent No.: US 7,206,821 B2
(45) Date of Patent: Apr. 17, 2007

(54) SYSTEM AND METHOD FOR RECORDING INFORMATION ON A STORAGE MEDIUM

(75) Inventor: Ichiro Moritomo, Kanagawa (JP)

(73) Assignees: Ricoh Co. Ltd., Tokyo (JP); Ricoh Corporation, San Jose, CA (US)

( * ) Notice: Subject to any disclaimer, the term of this patent is extended or adjusted under 35 U.S.C. 154(b) by 653 days.

(21) Appl. No.: 09/764,270

(22) Filed: Jan. 19, 2001

(65) Prior Publication Data

US 2005/0256936 A1  Nov. 17, 2005

(51) Int. Cl.
G06F 15/16 (2006.01)
(52) U.S. Cl. .................. 709/217; 725/87; 711/115; 386/124; 386/126; 369/47
(58) Field of Classification Search ........... 345/762; 369/47, 30, 53; 701/200; 710/68, 74, 72; 711/114, 115; 713/1, 189; 340/3.31; 705/27, 705/52; 709/219; 725/87; 386/83, 126
See application file for complete search history.

(56) References Cited

U.S. PATENT DOCUMENTS

| | | | | |
|---|---|---|---|---|
| 5,794,217 A * | 8/1998 | Allen | ................... | 705/27 |
| 5,951,620 A * | 9/1999 | Ahrens et al. | ........... | 701/200 |
| 6,219,321 B1 * | 4/2001 | Serizawa et al. | ....... | 369/47.33 |
| 6,295,564 B1 * | 9/2001 | Shigetomi et al. | ........... | 710/74 |
| 6,320,827 B1 * | 11/2001 | Otsuka | ................. | 369/30.06 |
| 6,330,675 B1 * | 12/2001 | Wiser et al. | ............... | 713/189 |
| 6,349,352 B1 * | 2/2002 | Lea | ................... | 710/72 |
| 6,404,707 B1 * | 6/2002 | Kaneda et al. | ........... | 369/30.06 |
| 6,421,069 B1 * | 7/2002 | Ludtke et al. | ............. | 345/762 |
| 6,438,631 B1 * | 8/2002 | Kawase | ................... | 710/68 |
| 6,460,076 B1 * | 10/2002 | Srinivasan | ................ | 709/219 |
| 6,532,535 B1 * | 3/2003 | Maffezzoni et al. | ........... | 713/1 |
| 6,545,587 B1 * | 4/2003 | Hatakeyama et al. | ...... | 340/3.31 |
| 6,574,704 B1 * | 6/2003 | Ishida | ................... | 711/114 |
| 6,601,139 B1 * | 7/2003 | Suzuki | ................... | 711/115 |
| 6,606,285 B1 * | 8/2003 | Ijtsma et al. | .............. | 369/47.1 |
| 6,628,591 B1 * | 9/2003 | Yokota et al. | ........... | 369/53.21 |
| 6,646,965 B1 * | 11/2003 | Kim | ................... | 369/47.53 |
| 6,671,454 B1 * | 12/2003 | Kaneko et al. | ............. | 386/83 |
| 6,950,605 B1 * | 9/2005 | Smolenski et al. | ......... | 386/126 |
| 2002/0056118 A1 * | 5/2002 | Hunter et al. | ............. | 725/87 |
| 2002/0111912 A1 * | 8/2002 | Hunter et al. | ............. | 705/52 |

* cited by examiner

*Primary Examiner*—John Follansbee
*Assistant Examiner*—Dustin Nguyen
(74) *Attorney, Agent, or Firm*—Oblon, Spivak, McClelland, Maier & Neustadt, P.C.

(57) ABSTRACT

A method and system for controlling the downloading of information to a computer. Depending upon the characteristics of a storage drive and/or the data which is to be downloaded, the data may be downloaded to a recordable storage medium without first storing the data to a hard disk drive. Alternatively, the data may be stored on a hard disk drive when it is downloaded.

112 Claims, 8 Drawing Sheets

SYSTEM AND METHOD FOR RECORDING INFORMATION ON A STORAGE MEDIUM

BACKGROUND OF THE INVENTION

1. Field of the Invention

The present invention relates to the recording of information on a storage medium. The invention further relates to the transmission of information over a computer network and subsequently storing the information on a storage medium, such as a removable storage medium.

2. Discussion of the Background

Systems utilized to download information such as computer programs, music, and images over a network or the Internet from a server to a computer such as a Personal Computer ("PC") are known. In conventional systems, when data is downloaded, it is stored on a hard disk drive of the PC. If a user desires to store the downloaded information on a removable medium, the information which has been stored on the hard disk drive is subsequently transferred to a removable storage medium such as a CD-R, a CD-RW, or a DVD-RAM. However, the present inventor has noticed that additional time is needed after the download to transfer the information from the hard disk to the removable medium.

SUMMARY OF THE INVENTION

The present invention provides a method and system for transmitting information to a computer having a removable medium. According to the invention, a computer requests information or a signal to download is generated, a determination is made as to whether a device having structure to write to a storage medium meets predetermined criteria and is therefore an appropriate device for writing to the removable medium. Subsequently, information is transmitted to the computer in order for the computer to write the information to the storage medium.

According to a further embodiment, the information is transmitted to the computer without writing to an intermediate storage medium such as a hard disk drive. Alternatively, when it is determined that the device is not an appropriate device for writing to the removable medium, there is a transmitting of information to the intermediate storage device followed by a transfer of this information from the intermediate storage device to the removable medium.

According to another embodiment, the invention includes a method and system for receiving information having different priorities. Information of a first priority is written to a hard disk drive of the computer, and information of second importance which is of less importance than the first importance information may be written to the removable storage medium without writing this information in a hard disk drive. According to yet another implementation of the invention, the first importance information is a computer program, and the second importance information is data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
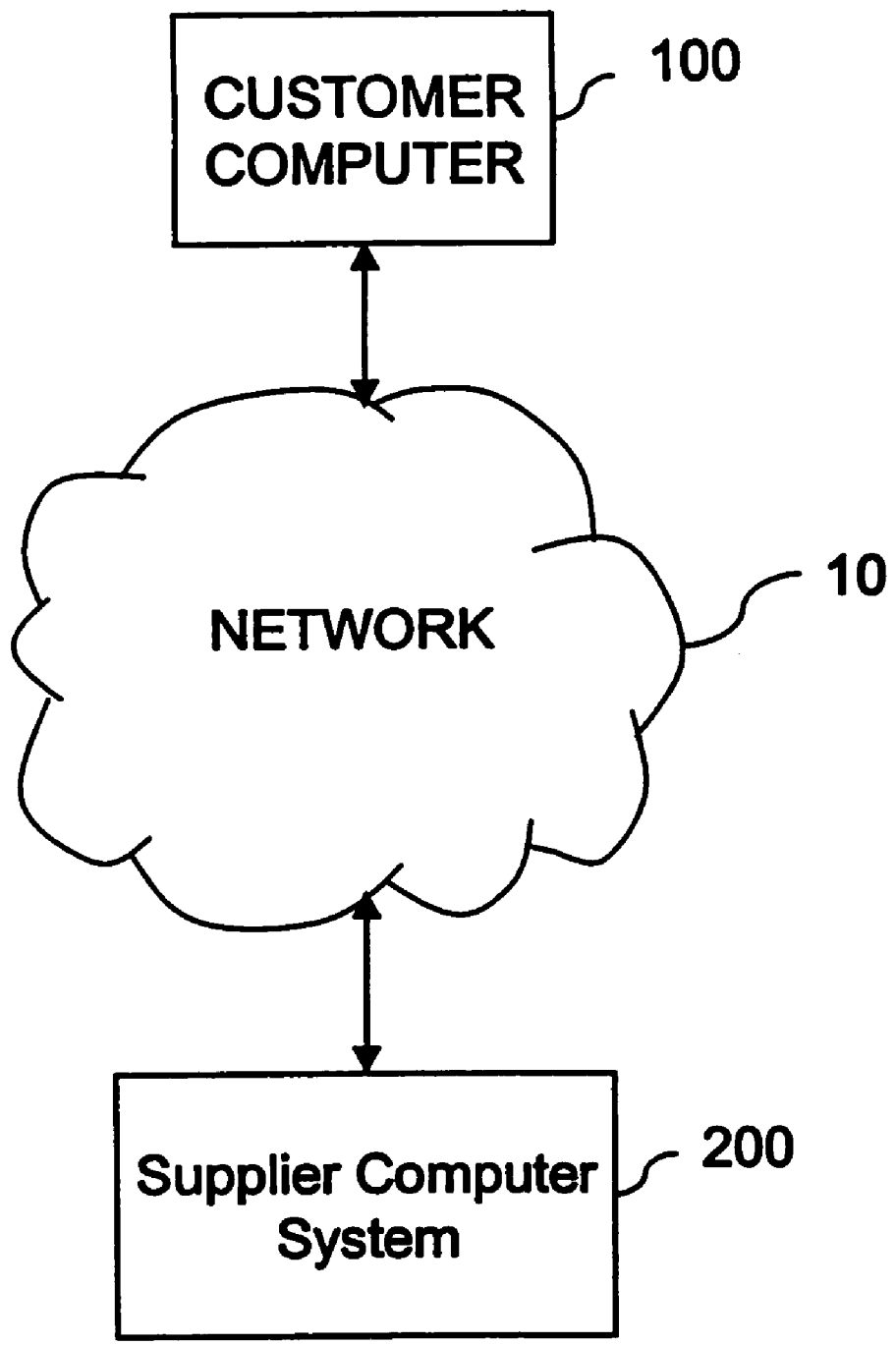
FIG. 1 illustrates a general system of the present invention.

Referring now to the drawings, wherein like reference numerals designate identical or corresponding parts throughout the several views, and more particularly to FIG. 1 thereof, there is illustrated a computer system according to the present invention. In FIG. 1, there is a customer computer or computer system 100 connected to a network 10. Typically, this computer or computer system is a personal computer ("PC"), and the term PC is used throughout this application. However, the computer 100 is not limited to a PC but may be implemented by any type of computing device.

The network 10 preferably includes the Internet, although the invention is not limited to using only the Internet and includes the use of other types of networks such as but not limited to a Wide Area Network ("WAN"), a private network, or a Virtual Private Network, for example. Also connected to the network 10 is a supplier computer system 200. In FIG. 1, the customer computer 100 is a computer used by an entity including a person, company, corporation, or any other entity which desires to obtain information such as but not limited to, a computer program or computer instructions which cause a processor to execute specific acts, and/or computer data which are typically not computer instructions, such as, but not limited to music or audio, images, text, and other types of data or parameters, for example. The supplier computer system 200 is a computer system used for selling, auctioning, volume buying, buying in which a price is set based on the number of items being purchased, transferring, providing, or distributing information, preferably to the customer computer 100. The supplier computer system 200 may be owned by the actual supplier, may be owned by an independent third party which is associated with the supplier and provides computer services or sales services for the supplier, and/or owned or operated by any desired entity including but not limited to an independent third party.

Figure 2:
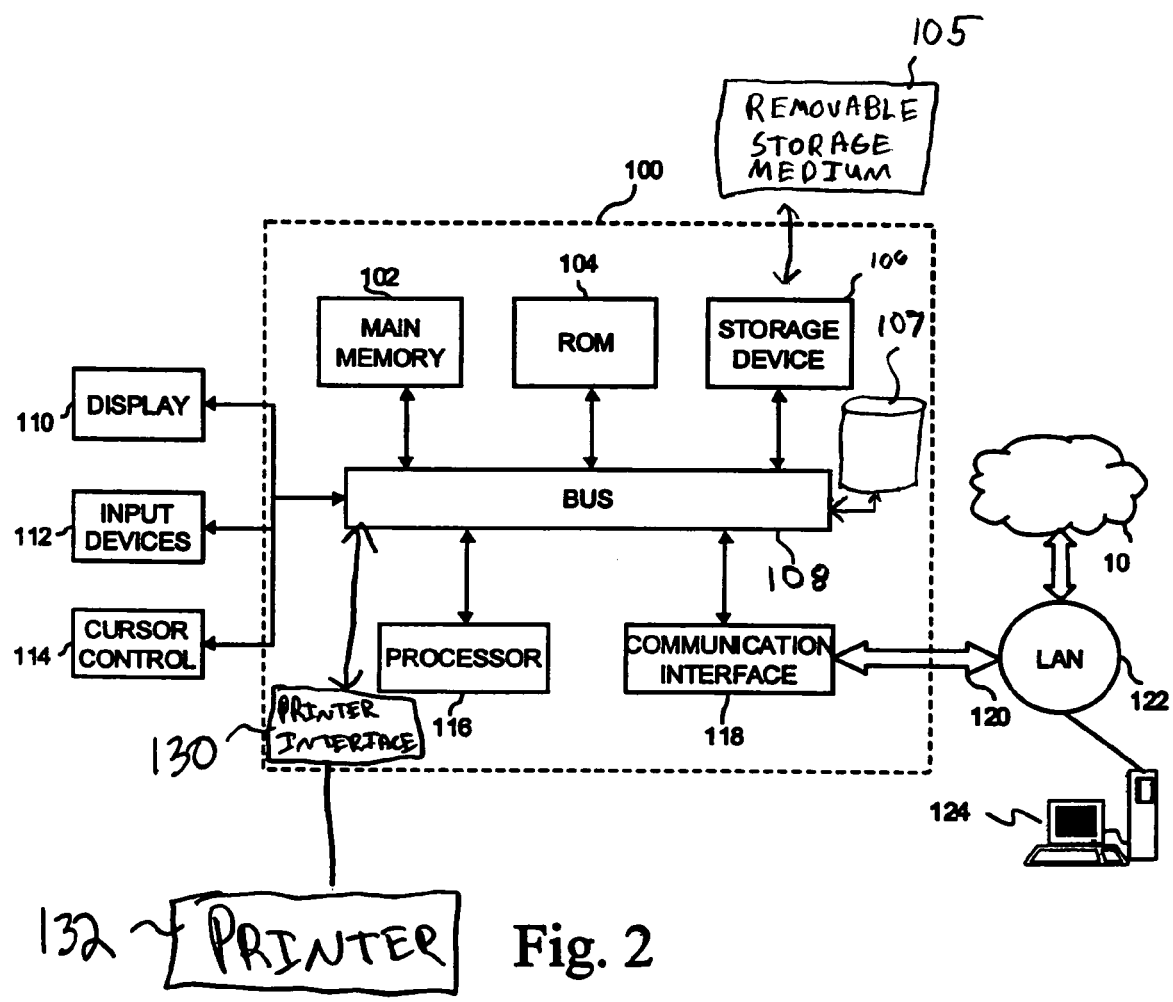
FIG. 2 illustrates details of the customer computer 100 of FIG. 1.

The customer computer 100 is illustrated in more detail in FIG. 2. The customer computer 100 may be implemented as a general purpose computing system which has access to a network such as the Internet, although any type of computing device may be utilized as the customer computer 100 including, but not limited to, desktop devices, portable computing devices, palm-type computing devices, a cellular phone having web browsing capabilities connected to the Internet, a device having a wired or wireless connection to the Internet, or any other desired computing device. For the exemplary computer 100 illustrated in FIG. 2, there is a main memory 102, such as a random access memory ("RAM") or other storage device, e.g., dynamic RAM ("DRAM"), static RAM ("SRAM"), synchronous DRAM ("SDRAM"), and/or flash RAM, which stores information and/or instructions to be executed by a processor 116. The processor 116 may be any desired type of processing circuitry including, but not limited to a specialized processing device or, a microprocessor such as a microprocessor from Intel, AMD, Texas Instruments, Hitachi, or any other processor manufacturer. In addition, the main memory 102 may be used for temporarily storing temporary variables or other intermediate information used or generated during the execution of instructions by the processor 116. Customer computer 100 also includes a read only memory ("ROM") 104 or other static storage device such as a programmable ROM ("PROM"), an erasable PROM ("EPROM"), and/or an electrostatically erasable PROM ("EEPROM") for storing static information and/or instructions for processor 116. A storage device 106 reads and writes information to a storage medium such as a removable storage medium 105 which may be implemented as a magnetic disk, optical disc, magneto-optical disk, semiconductor memory, or any other type of storage device is utilized for storing information and/or instructions such as a memory card or memory stick. A typical optical disc which may be utilized as the storage medium 105 includes, but is not limited to a CD-R, a CD-RW, a hybrid recordable disc, a DVD-R, DVD-RAM, a DVD based disc or any other desired type of optical disk. The removable storage medium 105 is preferably removable, but is not required to be removable. Therefore, the storage medium 105 may be implemented, if desired, to be non-removable, or not readily removable by the user. An additional drive or storage device 107 may be implemented as a hard disk drive, although any type of storage device or drive may be utilized, if desired.

The customer computer 100 may also include special purpose logic devices (e.g., application specific integrated circuits ("ASICs")) or configurable logic devices (e.g., generic array or logic ("GAL") or reprogrammable field programmable gate arrays ("FPGAs")). Other removable media devices (e.g., a compact disc, a tape, and/or a removable magneto-optical media, or other type of optical media) or fixed, high-density media drives may be included in the computer 100 by connection to an appropriate device bus (e.g., a small computer system interface ("SCSI") bus, an enhanced integrated device electronics ("EIDE") bus, or an ultra-direct memory access bus). The computer 100 may also include a compact disc reader, a compact disc reader-writer unit, or a compact disc jukebox, each of which may be connected to a device bus or any type of bus such as a bus 108 in FIG. 2 which connects the various components of the computer 100.

The computer system 100 is coupled via the bus 108 to a display 110 such as a cathode ray tube or liquid crystal display for displaying information to a user of the computer 100. The display 110 may be controlled by a display or graphics card. Further, the computer system includes input devices 112 such as a keyboard or other input device, and a cursor control 114 for communicating information and command selections to the computer 100. The cursor control 114, for example, may be implemented as a mouse, a track ball, cursor direction keys, or any other desired pointing device for communicating direction, location, or selection information, and/or command selections to processor 116 and for controlling cursor movement on the display 110. Further included in FIG. 2 is a printer interface 130, connected to the bus 108, which allows the outputting of desired information on a printer 132. The printer 132 may be implemented as any desired type of printing device including, but not limited to, a laser beam based printing device, an ink jet printing device, an LED based printing device, an impact printer, or any other desired type of printer. The printer 132 may be utilized to print bills generated by the present invention or to print any other desired type of information.

The customer computer 100 communicates with the supplier computer system 200. One manner of communicating by the customer computer is over a local area network ("LAN") such as the LAN 122 illustrated in FIG. 2. For a typical business customer, access to the network 10 and/or the Internet in order to gain access to the supplier computer system 200 is through a LAN and in such a situation, a communication interface 118 may be implemented as a network interface card which communicates with the LAN 122 over a connection 120. The LAN 122 may have access to the network 10 via a router, server, or any other desired computing or routing device. A generic computer 124 is also shown to be connected to the LAN 122 in order to demonstrate that it is possible, although not necessary, for the LAN to be connected to a number of computers. It is also possible for the communication interface 118 to be implemented as any other desired communication interface, such as a wireless interface, or through a modem wired to a public switched telephone network ("PSTN"). In this case, the LAN 122 may not be necessary, although it may be utilized for another purpose. Moreover, the modem may be an individual modem or a modem pool which is available to a number of computers on the LAN 122. In this case, the interface between the LAN 122 and the network 10 would be through a modem and PSTN or IDSN. The communication interface 118 may be alternatively implemented as an asymmetrical digital subscriber line ("ADSL") card, an integrated services digital network ("ISDN") card, or a modem to provide a data communication connected to a corresponding type of telephone line. Additionally or alternatively, wireless links may be implemented using electrical, electromagnetic, optical, or audio signals that carry data streams representing various types of information.

As stated above, the computer 100 preferably includes at least one computer readable medium or memory programmed for storing the program code utilized to carry out or for performing all or a portion (if processing is distributed) of the processing performed when implementing the present invention. Computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 116 for execution or providing data which is utilized or processed by the computer. A computer readable medium may take many forms including but not limited to, non-volatile media, volatile media, and transmission media. Non-volatile media includes, for example, optical, magnetic discs, and magneto-optical discs, such as the removable storage medium 105, and volatile media includes dynamic memory, such as the main memory 102. Transmission media includes coaxial cables, copper wires, fiber optics, wires that comprise the bus 108, and also the atmospheric or local environment through which acoustic, light, or radio frequency waves are transmitted for communications.

Figure 3A:
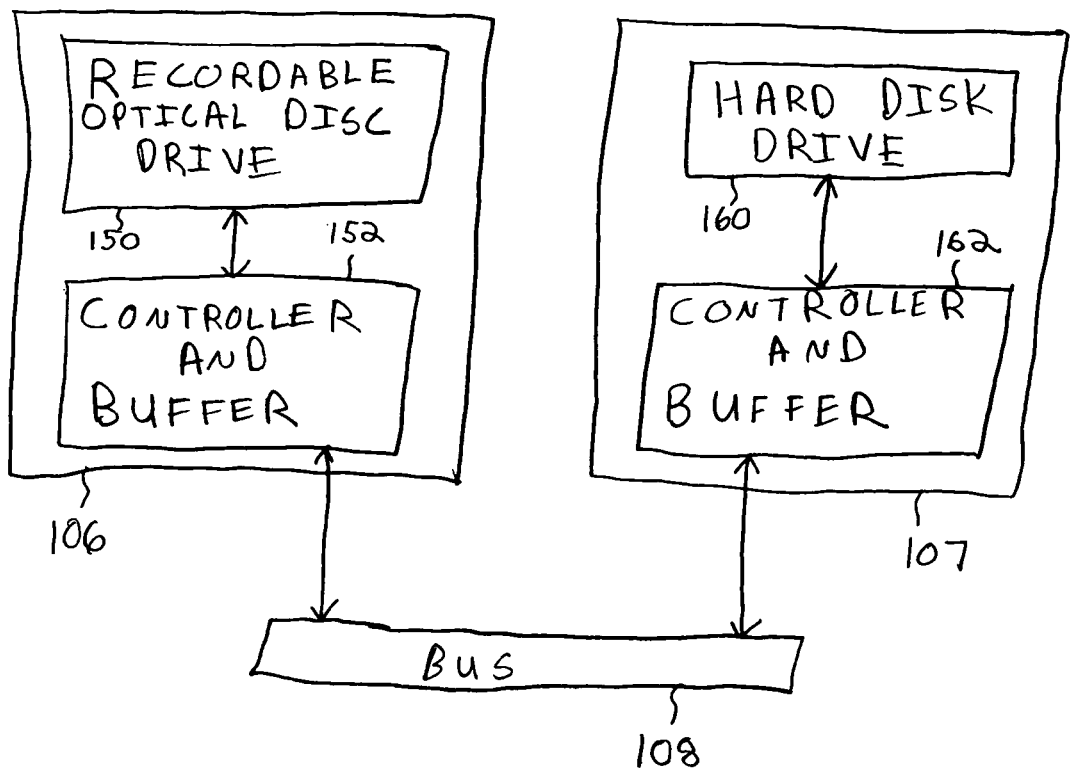
FIG. 3A illustrates an embodiment of the storage device 106 and the hard disk drive 107 of the computer of FIG. 2.

The storage device 106 and hard disk drive 107 may be implemented in any desired manner, or alternatively implemented as other devices for example, as described above. When the drives are implemented, according to one embodiment, as an enhanced or expanded Integrated Drive Electronics drive (EIDE), the structure of these devices may be as illustrated as shown in FIG. 3A. In FIG. 3A, the storage device 106 includes a controller and buffer 152 along with a recordable optical disc drive 150. For an IDE and an EIDE, the controller is typically part of the drive electronics. For the storage drive 107, there is shown a hard disk drive 160 connected to a controller and buffer 162. Both the storage device 106 and 107 are connected to the bus 108.

Figure 3B:
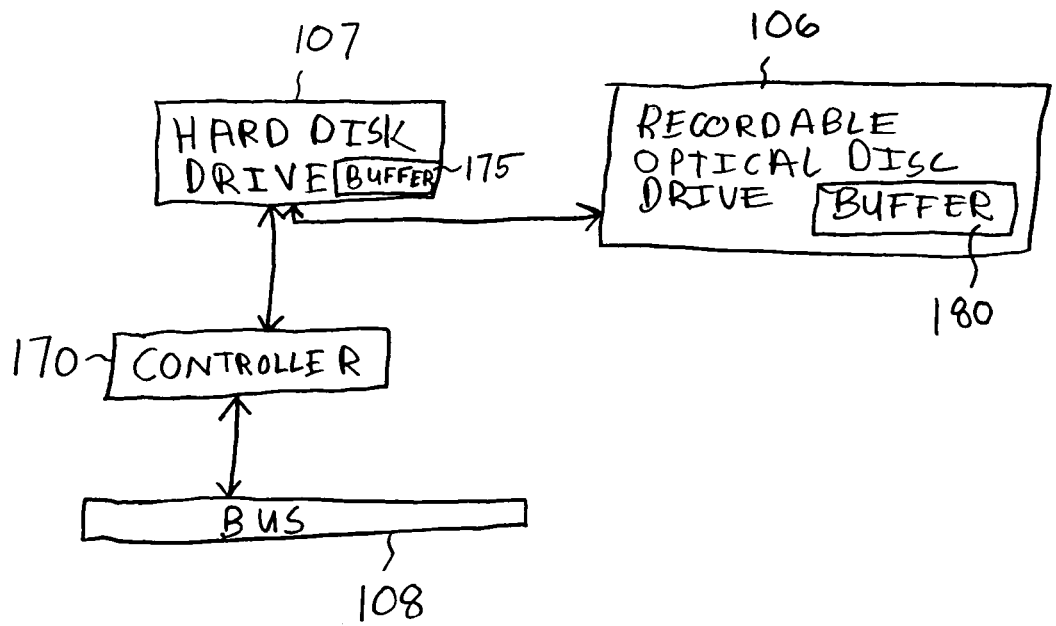
FIG. 3B illustrates an alternative embodiment of the hard disk drive 107 and the storage drive 106 of the computer 100 of FIG. 2.

An alternative manner of connecting the hard disk drive 107 and recordable optical disc drive 106 to the bus is illustrated in FIG. 3B. In FIG. 3B, a single controller 170, connected to the bus 108, may be utilized to control both the hard disk drive 107 and the recordable optical disc drive 106. Each of these drives preferably has a respective storage buffer 175 and 180. The embodiment of FIG. 3B may utilize a Small Computer System Interface (SCSI) to have a single controller control a plurality of drives. Examples of different SCSI implementations which may be utilized include the numerous SCSI standards such as SCSI-1, SCSI-2, fast SCSI-2, Y-SCSI-2, Fast Y-SCSI-2, Ultra SCSI-3, Ultra-2 SCSI, Y Ultra-2 SCSI, and Ultra 160/m. The controller 170 preferably includes processing circuitry and also a buffer. Alternative implementations of the drive structures and controllers may be utilized, if desired, and may utilize any known, conventional, or desired structure.

The invention relates to recording data onto a storage medium such as a removable storage medium using a storage device which may include a CD-R, or a CD-RW, for example. Recording such information on an optical disc drive without first storing the entire information onto a hard disk drive will save time in the recording process. The recording of information on an optical disc drive may have technical and/or commercial considerations. From a technical point of view, optical disc drives have historically had problems in recording information when this information cannot be constantly provided and the drive runs out of information to be recorded. If, during the recording process, a typical optical disc drive runs out of data, a problem, called buffer underrun occurs and the optical disc which was being recorded may be incomplete, or useless. Thus, from a technical point of view, it may not be possible to have a constant supply of data over a network such as the Internet to the optical disc drive.

Recently, two techniques have been developed which prevent buffer underrun and allow the writing or burning of an optical disc, even when a reliable stream of data cannot be provided to the disc. The company Ricoh has developed a technology called JustLink™ which automatically prevents buffer underrun errors by predicting them before they happen. This technology enables Ricoh's CD-R/RW drives which incorporate this technology to record data seamlessly between the end of one record point and the start of another record point, even though data transfer may be suspended due to the occurrence of a buffer underrun error. JustLink™ technology from Ricoh allows the user to multitask his or her PC such that other tasks can be performed when the optical disc is being created, and the source of data which is being written to the optical disc does not have to be perfect or provide a continuous stream of data.

The Ricoh JustLink™ technology works on the following principal. The amount of data accumulated in the buffer memory is constantly monitored during writing. If, for some reason, the data transfer speed from the computer falls below the writing speed, the amount of data accumulated in the buffer memory falls. When the amount of data in the buffer memory falls below a certain level, and the possibility of a buffer underrun is predicted if writing continues, writing is intentionally suspended for the time being. During the time that the writing is suspended, data transferred from the computer accumulates in the buffer memory. When enough data has accumulated, writing is resumed from the point directly after the point where it was suspended, and monitoring of the amount of data in the buffer memory is recommenced.

An alternative technology to Ricoh's JustLink™ is a technique or technology called Burn-Proof™. Burn-Proof™ allows a CD-R/RW drive to record data seamlessly between the end of one recorded point and the start of another recorded point, even though data transfer may be suspended due to the occurrence of a buffer underrun error. Burn-Proof™ technology helps prevent the creation of a useless disc and allows the user to multi-task on his or her PC. When the optical drive starts recording, the status of the buffer is constantly checked. Shortly before a buffer underrun might occur (typically when the buffer falls below 10% of its maximum capacity), the optical recorder will stop recording as of a specific portion on the disc. The CD recorder continues attempting to retrieve data from the PC and to rebuild the buffer. In the meantime, the Burn-Proof™ circuitry determines where the last successful sector is written. Using the location of the last successful sector, the Burn-Proof™ circuit will position the optical pick up. As soon as the buffer has been refilled, the CD drive will start recording again.

The present invention checks the capabilities, manufacturer, and/or model of a storage drive. The present invention may be configured to allow the direct recording of information from a network or the Internet onto an optical disc without first recording all of the information on a hard disk drive. However, this technique may only work for special types of disc drives such as drives having the Ricoh JustLink™ technology or Burn-Proof™ technology. An exemplary optical disc drive which includes the Ricoh JustLink™ technology which may be utilized with the present invention is the Ricoh MP9120ACD-R/RW/DVD drive.

Figure 4A:
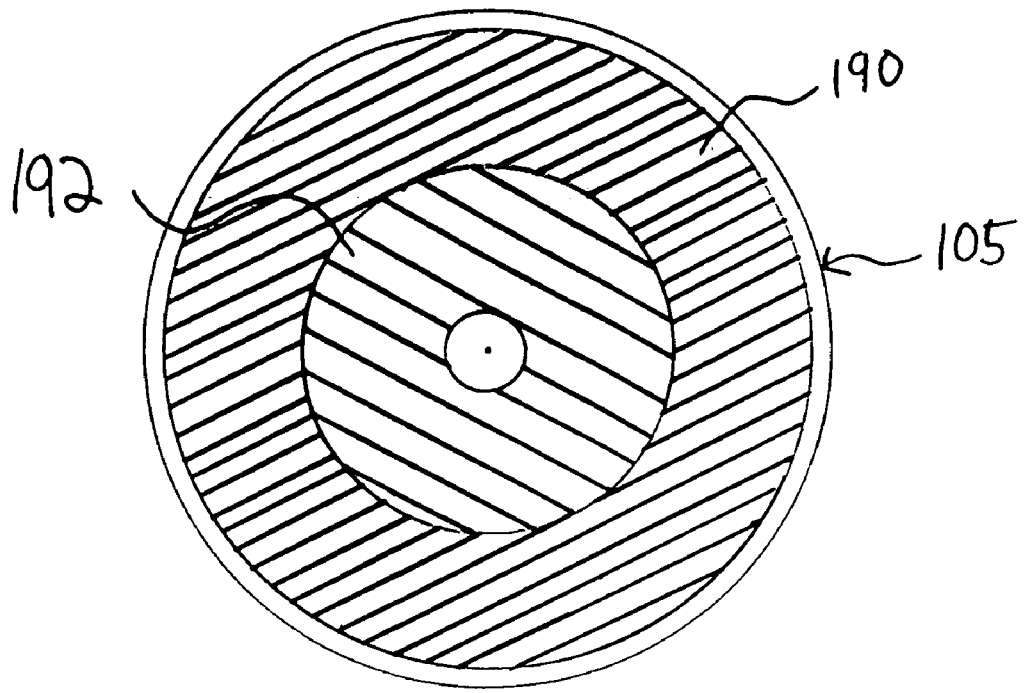
FIG. 4A illustrates an exemplary hybrid recordable disc.

FIG. 4A illustrates the storage medium 105 being a CD-R hybrid disc. A CD-R hybrid disc includes a prerecorded area e.g., typically a software program and/or data) in an area in which a user or other is able to store additional information, as desired. In FIG. 4A, the CD-R hybrid disc 105 including a Read Only Memory (ROM) portion 192 and a recordable portion 190. The ROM portion 192 is generally a stamped portion which includes a prerecorded software program, for example. Alternatively, the ROM portion 192 may be a burned or recorded portion. Further, the format of the ROM area 192 may be a CD-ROM format (defined by the Yellow Book), a CD-ROMXA format (defined by the Green Book), a CD-I format (defined by the Green Book), or a CD-DA format (defined by the Red Book). The Yellow, Green, and Red Books are industry standards. The recordable portion 190 is an area in which a user may record any information including the desired additional information for the disc.

Figure 4B:
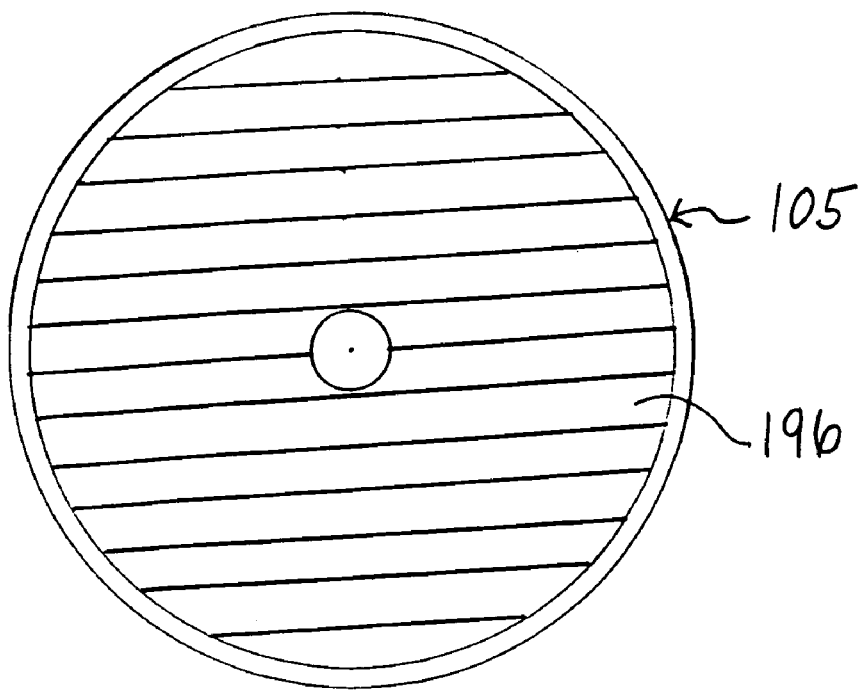
FIG. 4B illustrates an exemplary recordable disc.
Figure 5:
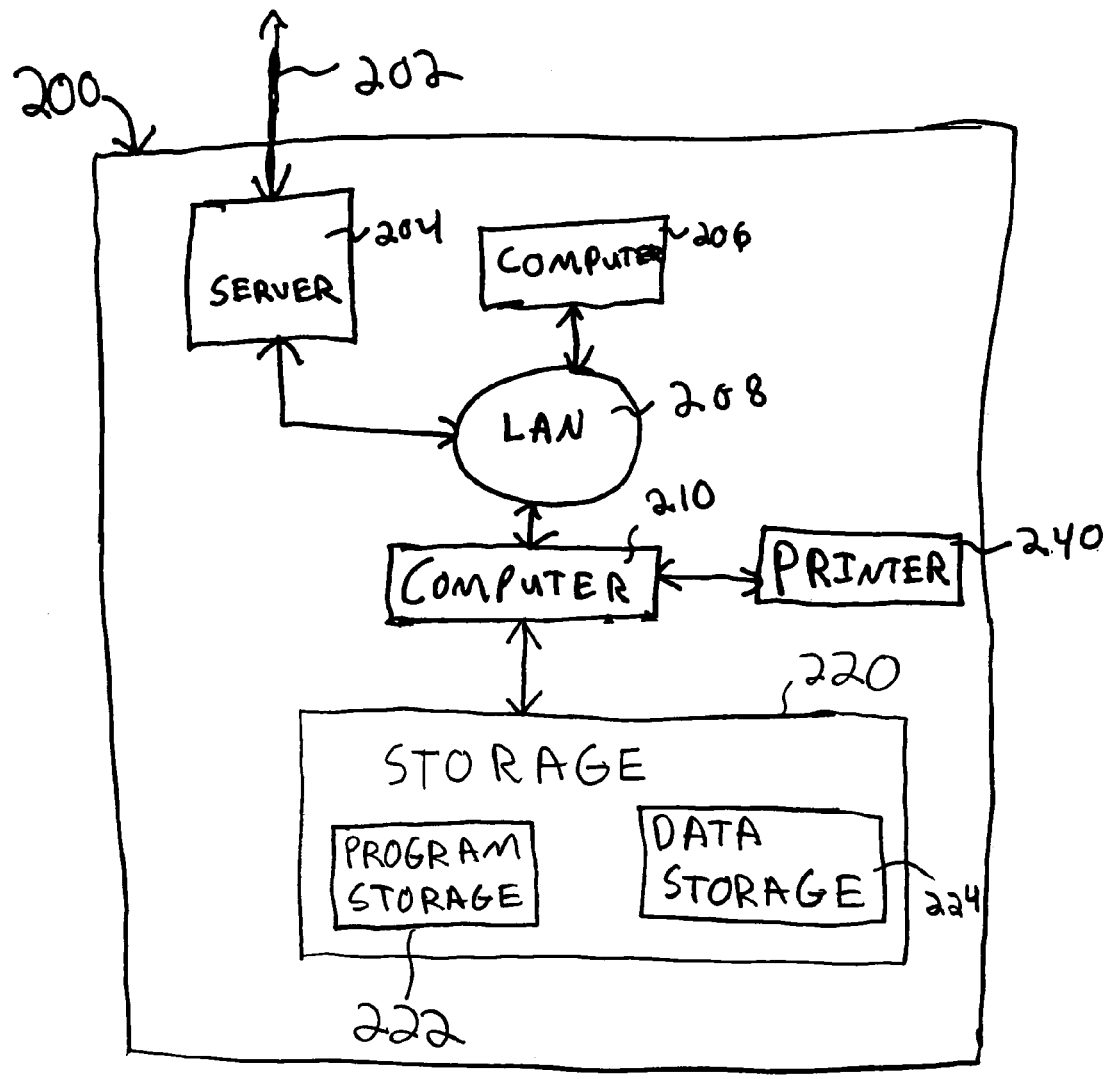
FIG. 5 illustrates an embodiment of the supplier computer system 200 illustrated in FIG. 1.

The present invention is not limited to being used with a CD-R hybrid disc but a conventional CD-R or CD-RW, as illustrated in FIG. 4B, may be utilized. In FIG. 4B, a disc 105 includes a recordable area 196. It is to be noted that there may be other portions of the discs of FIGS. 4A and 4B which have not been illustrated but are included in the various disc standards or on the disc. These are conventional features of the storage media and are presumed known.

While one feature of the present invention may achieve the technical effect of allowing a direct writing (e.g., without storing in the hard disk drive) to an optical disc only when the optical disc drive has the capability to deal with an interrupted or non-steady data flow, another feature of the present invention is the allowance of certain data to be provided and stored on the removable storage medium, only when a certain model disc drive is purchased. Thus, the present invention may be utilized to permit downloading of information to an optical disc or any other storage medium, only when the drive is detected to be of a specific brand and/or model. Therefore, a premium price, or other price, may be charged for certain hardware in a computer, such as the optical disc drive, and if a check determines that this hardware exists, then the information such as a program or data may be downloaded, thus encouraging the user to buy a drive from a specific manufacturer, or a specific type of drive or model drive from that manufacturer.

Figure 6A:
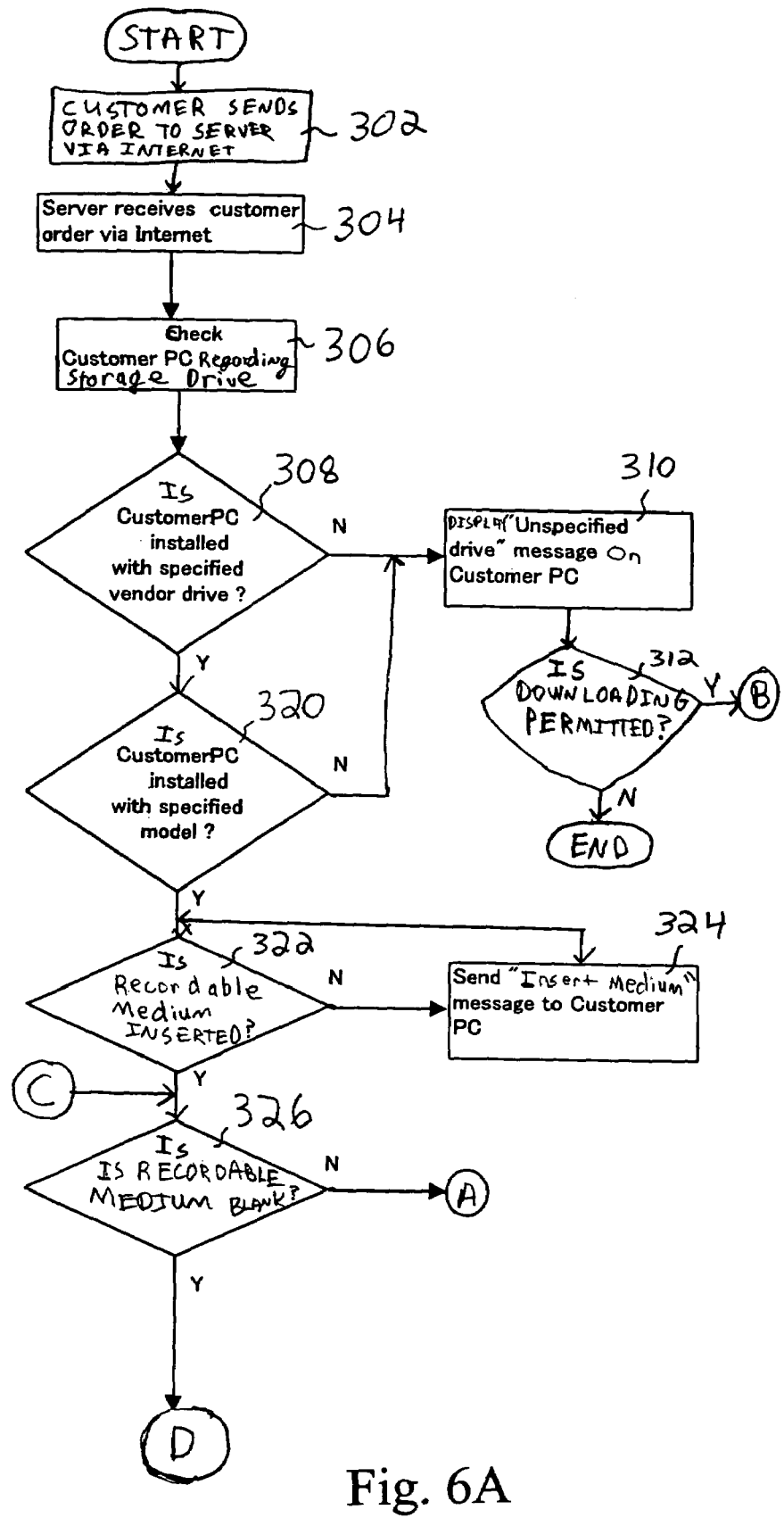
FIGS. 6A–6C are a flowchart showing an exemplary operation of the present invention.

The operation of the invention will now be explained with respect to the flowchart of FIGS. 6A–6C. In FIG. 6A, after starting, step 302 is performed in which the customer sends an order to the server computer via the Internet or some alternative network. In this embodiment, it is the customer which initiates the request for a file transfer or the order of a certain type of information including data and/or computer instructions. However, alternate embodiments permit the data to be automatically transmitted by a server computer or be manually transmitted by the server computer. In step 304, the server computer receives the customer order or request for information via the Internet. Step 306 is subsequently performed which checks the storage drive of the customer PC. This step has the purpose of determining characteristics such as state data of the storage drive. State data of the storage drive relates to any information regarding the storage drive including the state, the manufacturer, the model number, and/or the features or capabilities of the storage drive. One type of state data which may be utilized is static state data which does not change over time (e.g., the model number, manufacturer, or the serial number of example). The steps of checking the information related to the storage drive may be performed in any desired manner, including checking of files maintained by the Windows operating system, such as the registry. Different files may be examined for different types of operating systems and computers, and different types of queries may be performed. The information or state data regarding the storage drive may be automatically obtained or may be manually obtained or provided by the user.

Steps 308 and 320 examine specific features of the storage drive. Step 308 examines if the customer PC or computer has a drive from a specific vendor (e.g., Ricoh). In addition to or as an alternative to determining the manufacturer or the vender, step 320 examines the model of the storage drive. If neither step 308 nor step 320 determine that the storage drive is a specified one, flow proceeds to step 310 which displays to the user that his or her disk drive is an unspecified drive. Normally, if the drive is an unspecified drive, it may not be possible or desirable to allow the downloading of information directly to the drive at issue. According to an embodiment of the invention, downloading information directly means at least that the information is stored in the storage drive, without an intermediate step of storing on the hard disk drive. However, step 312 examines whether downloading is permitted, even if the drive is not a specified drive. If downloading is permitted, from step 312, flow proceeds to process B illustrated in FIG. 6B. If downloading is not permitted as the drive is not a specified drive, the process of FIGS. 6A–6C ends. It is to be noted that the flowchart of FIGS. 6A–6C is one implementation of the invention, and alternative methods are possible, including methods which do not perform one or more of the illustrated steps.

If steps 308 and/or 320 determine that the drive installed at the customer PC is a specified drive, flow proceeds to step 322. In step 322, it is determined whether a recordable medium is inserted into the storage drive. If a recordable medium is not inserted, a message is displayed on the customer PC such as a message requesting the customer or user to insert a storage medium in step 324. From step 324, flow proceeds back to step 322 to confirm that a recordable storage medium has been inserted into the storage drive. As an alternative to the loop of steps 322 and 324 which requires the insertion of a storage drive, if the user does not insert a storage medium, flow may proceed from step 324 to process B of FIG. 6B, if desired. After step 322 determines that a recordable medium has been inserted, step 326 is performed which examines if the recordable medium is blank. If the recordable medium is determined to be blank, flow proceeds to process D of FIG. 6C which prepares for the writing of information. If step 326 determines that the recordable medium is not blank, flow proceeds to process A illustrated in FIG. 6B.

Figure 6B:
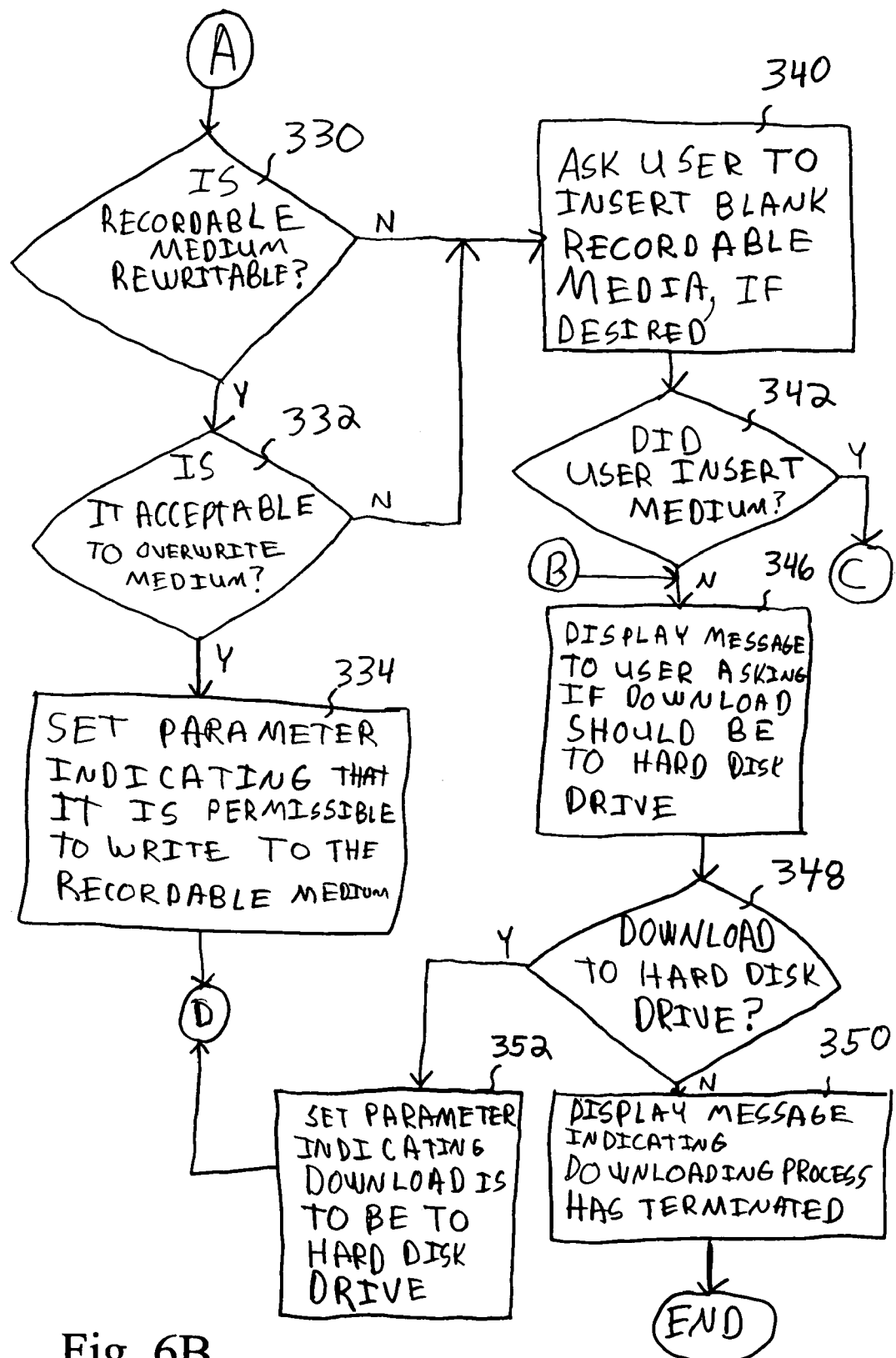

In FIG. 6B, from process A, step 330 is performed which determines if the recordable medium is rewritable. If the recordable medium is rewritable, flow proceeds to step 322 which determines whether it is acceptable to overwrite the information which already exists on the storage medium. If it is acceptable to overwrite the information on the storage medium, flow proceeds from step 332 to step 334 which sets a parameter indicating that is permissible to write to the recordable medium. Thus, when it is time to record the information, an indication will be given that is acceptable or permissible to write the information to the recordable medium. From step 334, flow proceeds to process D of FIG. 6C.

If step 330 determines that the recordable medium is not rewritable or step 332 determines that it is not acceptable to overwrite the medium, flow proceeds to step 340 which asks the user to insert a blank recordable medium, if desired. Step 340 allows the user the option to insert a new recordable medium in the storage drive in order to save the information. Step 342 examines whether the user inserted a storage medium. If the user did insert a storage medium, flow proceeds to process C in FIG. 6A. If the user did not insert a recordable medium, and from process B, step 346 is performed which displays a message to the user asking if the download of information should be to a hard disk drive. The present invention allows a writing of information during a download to a storage drive, such as a removable storage drive. If it is not permissible or possible to write to the storage medium in the storage drive, then the information may still be downloaded but it may be to the hard disk drive, as opposed to the storage medium within the storage drive. From step 346, step 348 is performed which determines if it is desirable to download the information to the hard disk drive. If it is not desirable or possible to download the information to the hard disk drive, flow proceeds to step 350 which displays a message indicating that the downloading process has terminated, and the process of FIGS. 6A–6C ends. If step 348 determines that it is desirable to download to the hard disk drive, step 352 is performed which sets a parameter indicating that downloading is to be done to the hard disk drive of the customer computer. From step 352, flow proceeds to process D in FIG. 6C.

Figure 6C:
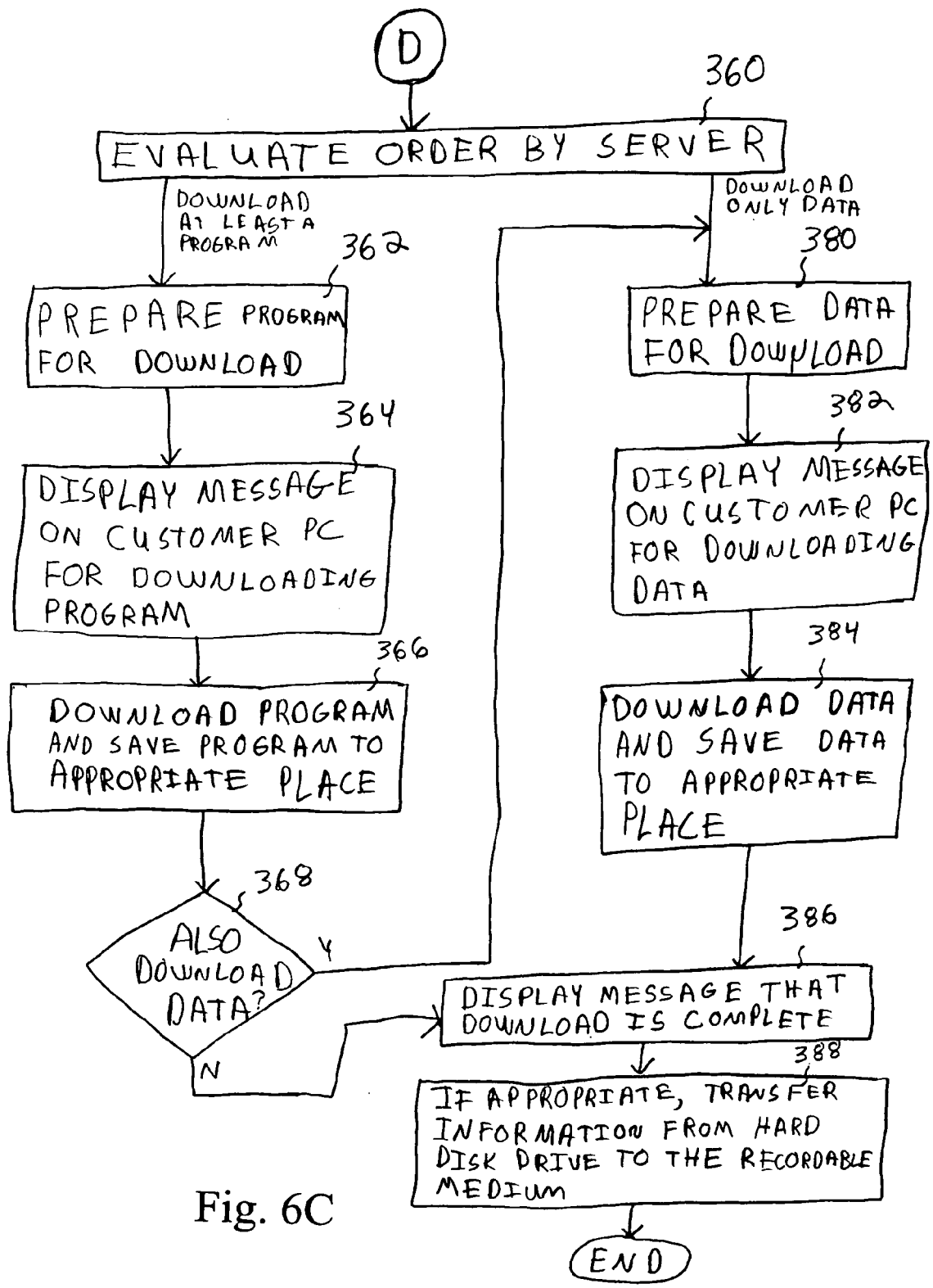

In FIG. 6C, step 360 evaluates the order or information which is desired to be transmitted. This step is preferably performed by the computer server. In evaluating the order or the information which is to be transmitted, the information to be transmitted can be program information which preferably is computer instructions, and/or the information to be transmitted may be data. If a program or a program and data are to be downloaded, flow proceeds to step 362. If only data is to be downloaded, flow proceeds to step 380. When it is determined that at least a program is to be downloaded, step 362 prepares the program for downloading. Such preparation can include retrieving the program which is to be transmitted, authenticating it, encrypting it, and/or compressing it, for example. In step 364, a message is displayed on the customer PC indicating that the downloading is about to begin or is occurring. In step 366, the program is downloaded and saved to the appropriate place. If step 334 is performed, it is permissible to write the data to the recordable medium. If step 352 has been previously performed, the data should be downloaded to the hard disk drive. However, depending upon the circumstances and the embodiment of the invention, the program may be saved directly to the recordable medium without being stored on the hard disk drive, or the data may be stored first on the hard disk drive. According to one embodiment, this is a preferred mode of operating when the storage drive has the appropriate characteristics or state data. According to another embodiment of the invention, program information has a higher importance than data. For this reason, the program information may be saved to the hard disk drive and then later transferred to the recordable medium. This will allow proper creation of the program section for subsequent transfer to the hybrid recordable disk, thus allowing flawless creation of program information which may be repeatedly recorded to a number of hybrid recordable disks, if desired. Additionally, and/or alternatively, the program may be recorded in any suitable location in order to satisfy the needs or desires of the receiving system and/or transmitting system. After step 366, step 368 is performed which determines if in addition to program information, data is also to be downloaded. When there is also data to be downloaded, and also when step 360 determines that only data is to be downloaded, flow proceeds to step 380.

In step 380, the data is prepared to be downloaded. This step may be performed in the same or similar manner as step 362 is performed, except it relates to data instead of program information. Step 382 displays a message on the customer PC indicating that there will shortly be downloading of data or the downloading of data is beginning or occurring. Step 384 downloads the data and saves the data to the appropriate place, e.g., the hard disk drive or the storage medium, as appropriate. This step is performed based possibly on steps 334 or 352. Alternatively, the data may be saved to the storage drive having the removable recordable media. It is to be noted that even when the information which is downloaded is saved directly to the recordable media, it may be desired to buffer or store the information in a semiconductor based memory such as a Random Access Memory prior to being recorded on the recordable medium. In such a system, the data is temporarily saved, but is preferably not saved to the hard disk drive. From step 384 and a negative determination in step 368, flow proceeds to step 386 which displays a message to the user that the downloading is complete. Next, if the information was saved on the hard disk drive (or other memory), the information may be transferred to the recordable medium in step 388. The process of FIGS. 6A–6C then ends.

The present invention provides a variety of ways of downloading and storing data to various types of storage media. In certain embodiments, the present invention allows the information to be written to the storage medium without first being stored on the hard disk drive, even when the removable storage medium is used with a storage drive which is not of the specified type. Further, it may be possible to force a downloading of information to a hard disk drive, when it is not desirable or possible to directly write the information to the storage drive without first using the hard disk drive as a buffer.

The present invention has been described above with respect to general purpose digital computers. The software coding for such computers can readily be prepared by skilled programmers based on the teachings of the present disclosure, as will be apparent to those skilled in the software art. The invention may also be implemented by the preparation of application specific integrated circuits or by connecting an appropriate network of conventional component circuits, as will be readily apparent to those skilled in the art.

The present invention also includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, flash memory, magnetic or optical cards, or any type of media suitable for storing electronic instructions. The invention also includes a memory such as any of the described memories herein which store data structures corresponding to the computer program product of the invention.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of transmitting information to a computer having a removable medium, comprising the steps of:

receiving a request from the computer to download information over a network;

determining whether a device of the computer having structure to write to the removable medium meets predetermined criteria including a capability to deal with an interrupted or non-steady data flow and is therefore an appropriate device for writing to the removable medium; and transmitting information to the computer in order for the device of the computer to write the information to the removable medium, wherein the transmitting step comprises:

transmitting the information from the network to the removable medium without writing any of the information to an intermediate storage device when the determining step determines that the device is an appropriate device for writing to the removable medium, and transmitting the information to the computer in order for the intermediate storage device to store the information followed by reading the information from the intermediate storage device and writing the information to the removable medium using the device, when the determining step determines that the device is not an appropriate device for writing to the removable medium.

2. A method according to claim 1, wherein said determining step comprises:
determining whether the device is an appropriate device by examining state data of the device.

3. A method according to claim 2, wherein said determining step comprises:
determining whether the device is an appropriate device by examining the state data of the device which includes at least a model number of the device.

4. A method according to claim 2, wherein said determining step comprises:
determining whether the device is an appropriate device by examining the state data of the device which includes at least a manufacturer of the device.

5. A method according to claim 1, further comprising the step of:
prohibiting the transmitting of the information to the computer, when the determining step determines the device of the computer does not meet the predetermined criteria.

6. A method according to claim 1, further comprising the step of:
determining if information is written to the removable medium; and the step of transmitting is performed when it has been determined that no information is written to the removable medium.

7. A method according to claim 6, further comprising the step of:
prohibiting a writing of information to the removable medium, when it has been determined that the removable medium contains previously written information.

8. A method according to claim 6, further comprising the step of:
notifying a user that information is written to the removable medium.

9. A method according to claim 7, further comprising the step of:
writing the information to a memory in the computer which is other than the removable medium, when it has been determined that the removable medium contains previously written information.

10. A method according to claim 1, wherein the step of transmitting comprises:
transmitting the information to the computer in order for the device of the computer which is an optical disc drive to write the information to the removable medium which is an optical disc.

11. A method according to claim 10, wherein the step of transmitting comprises:
transmitting the information to the computer in order for the device of the computer which is an optical disc drive to write the information to the removable medium which is one of a CD-R and a CD-RW.

12. A method according to claim 1, wherein the step of transmitting the information to the computer in order for the intermediate storage device to store the information comprises:
transmitting the information to the computer in order for the intermediate storage device which is a hard disk drive to store the information.

13. A method of recording information on a removable medium, comprising the steps of:
receiving information from a network by a computer;
writing information to the removable medium using a device of the computer having structure to write to the removable medium, only if it is determined that a device of the computer having structure to write to the removable medium has structure which makes the device an appropriate device for writing to the removable medium by having a capability to deal with an interrupted or non-steady data flow,
wherein the writing step comprises:
writing the information received from the network to the removable medium using the device, without writing any of the information to an intermediate storage device when it is determined that the device is an appropriate device for writing to the removable medium, and
writing the information to the intermediate storage device followed by reading the information from the intermediate storage device and writing the information to the removable medium using the device, when it is determined that the device is not an appropriate device for writing to the removable medium.

14. A method according to claim 13, further comprising the step of:
determining whether the device is an appropriate device by examining state data of the device.

15. A method according to claim 14, wherein said determining step comprises:
determining whether the device is an appropriate device by examining the state data of the device which includes at least a model number of the device.

16. A method according to claim 14, wherein said determining step comprises:
determining whether the device is an appropriate device by examining the state data of the device which includes at least a manufacturer of the device.

17. A method according to claim 14, wherein said determining step is performed by the computer which includes the device.

18. A method according to claim 14, wherein said determining step is performed by a remote computer which transmits the information to the computer which includes the device.

19. A method according to claim 13, further comprising the step of:
prohibiting the writing of the information to the removable medium, when it is determined that the device is not an appropriate device for writing to the removable medium.

20. A method according to claim 19, wherein said prohibiting step comprises:
prohibiting a downloading of the information from a remote computer, when the determining step determines that the device is not an appropriate device for writing to the removable medium.

21. A method according to claim 13, further comprising the step of:
determining if information is written to the removable medium; and
the step of writing the information to the removable medium operates when it has been determined that no information is written to the removable medium.

22. A method according to claim 21, further comprising the-step of:
prohibiting a writing of information to the removable medium, when it has been determined that the removable medium contains previously written information.

23. A method according to claim 21, further comprising the step of:
notifying a user that information is written to the removable medium.

24. A method according to claim 22, further comprising the step of:
  writing the information to a memory in a computer which is other than the removable medium, when it has been determined that the removable medium contains previously written information.

25. A method according to claim 13, wherein the step of writing comprises:
  writing the information to an optical disc.

26. A method according to claim 25, wherein the step of writing comprises:
  writing the information to one of CD-R and a CD-RW.

27. A method according to claim 13, wherein the step of writing the information to the intermediate device comprises:
  writing the information to the intermediate device which is a hard disk drive.

28. A method of storing information, comprising the steps of:
  receiving information from a network by a computer, the information including first importance information, and second importance information having an importance which is lower than the first importance information;
  writing the first importance information to a hard disk drive of the computer;
  writing the second importance information received from the network to a storage medium which is different from the hard disk drive, without writing any of the second importance information to the hard disk drive when a device configured to write to the storage medium does satisfy predetermined criteria including a capability to deal with an interrupted or non-steady data flow, and
  wherein said step of writing the second importance information writes the second importance information to the hard disk drive, when the device configured to write to the storage medium does not satisfy predetermined criteria including at least one of a model number and a manufacturer.

29. A method according to claim 28, further comprising the step of: requesting, by the computer, that the information be transmitted thereto.

30. A method according to claim 29, further comprising the step of:
  transmitting, to a remote computer over a network, state data of the device which writes to the storage medium.

31. A method according to claim 30, wherein the step of transmitting state data comprises:
  transmitting the state data which includes a model number of the device.

32. A method according to claim 30, wherein the step of transmitting state data comprises:
  transmitting the state data which includes a manufacturer of the device.

33. A method according to claim 28, further comprising the step of:
  determining information of the device configured to write to the storage medium,
  wherein the step of writing the second importance information is only performed when the information of the device configured to write satisfies the predetermined criteria.

34. A method according to claim 28, wherein:
  the step of writing the first importance information writes computer instructions; and
  the step of writing the second importance information writes computer data.

35. A method according to claim 28, further comprising the step of:
  receiving a message from a remote computer indicating that a transmitting of information is prohibited, when the device configured to write to the storage medium does not satisfy predetermined criteria including at least one of a model number and a manufacturer.

36. A method according to claim 28, wherein:
  said predetermined criteria includes at least one of a model number and a manufacturer.

37. A method according to claim 28, further comprising the step of:
  determining, before said step of writing the second importance information, that no information is recorded on the storage medium,
  wherein said step of writing the second importance information is performed when it is determined that no information is recorded on the storage medium.

38. A method according to claim 37, further comprising the step of:
  receiving a message from said server that said downloading operation is prohibited when the device which writes to said storage medium does not meet the predetermined criteria.

39. A method according to claim 28, further comprising the step of:
  receiving an indication that information is recorded on the storage medium, and
  said step of writing the second importance information is performed, even when the indication is received that information is recorded on the storage medium.

40. A method according to claim 39, further comprising the step of:
  providing, by a user, an instruction to perform said step of writing the second importance information, when there exists an indication that information is recorded on the storage medium.

41. A method according to claim 28, further comprising the step of:
  receiving an indication that information is recorded on the storage medium, and
  writing the first and second importance information to the hard disk drive, when there is an indication that information is recorded on the storage medium.

42. A method according to claim 28, wherein the step of writing the second importance information comprises:
  writing the second importance information to the storage medium which is one of a CD-R and a CD-RW.

43. A method of transmitting information, comprising the steps of:
  receiving a request from a remote computer to download information over a network, the information including first importance information, and second importance information having an importance which is lower than the first importance information;
  transmitting the first importance information to the remote computer so that the first importance information is stored to a hard disk drive of the computer;
  transmitting the second importance information from the network to a storage medium of the remote computer which is different from the hard disk drive, without writing any of the second importance information to the hard disk drive when a device configured to write to the storage medium does satisfy predetermined criteria including a capability to deal with an interrupted or non-steady data flow, wherein the storing of the second importance information stores the second importance information to the hard disk drive, when the device configured to write to the storage medium does not satisfy predetermined criteria.

44. A method according to claim 43, further comprising the step of:
receiving, from the remote computer, state data of the device which writes to the storage medium.

45. A method according to claim 44, wherein the step of receiving state data comprises:
receiving the state data which includes a model number of the device.

46. A method according to claim 44, wherein the step of receiving state data comprises:
receiving the state data which includes a manufacturer of the device.

47. A method according to claim 43, further comprising the step of:
determining information of the device configured to write to the storage medium,
wherein the storing of the second importance information in the storage medium is only performed when the information of the device configured to write satisfies the predetermined criteria.

48. A method according to claim 43, wherein:
the step of transmitting the first importance information transmits the first importance information as computer instructions; and
the step of transmitting the second importance information transmits the second importance information as computer data.

49. A method according to claim 43, further comprising the step of:
transmitting a message to the remote computer indicating that a transmitting of information is prohibited, when the device configured to write to the storage medium does not satisfy predetermined criteria including at least one of a model number and a manufacturer.

50. A method according to claim 43, wherein:
the predetermined criteria includes at least one of a model number and a manufacturer.

51. A method according to claim 43, further comprising the step of:
determining, before storing the second importance information, that no information is recorded on the storage medium,
wherein the storing of the second importance information is performed when it is determined that no information is recorded on the storage medium.

52. A method according to claim 51, further comprising the step of:
transmitting a message to the remote computer that said downloading operation is prohibited when the device which writes to said storage medium does not meet the predetermined criteria.

53. A method according to claim 43, further comprising the step of:
receiving an indication that information is recorded on the storage medium, and
said storing of the second importance information is performed, even when the indication is received that information is recorded on the storage medium.

54. A method according to claim 53, further comprising the step of:
receiving, from a user, an instruction to perform said storing of the second importance information, when there exists an indication that information is recorded on the storage medium.

55. A method-according to claim 43 further comprising the step of:
receiving an indication that information is recorded on the storage medium, and
storing the first and second importance information to the hard disk drive, when there is an indication that information is recorded on the storage medium.

56. A method according to claim 43, wherein the storing of the second importance information stores the second importance information to one of a CD-R and a CD-RW.

57. A system of transmitting information to a computer having a removable medium, comprising:
means for receiving a request from the computer to download information over a network;
means for determining whether a device of the computer having structure to write to the removable medium meets predetermined criteria including a capability to deal with an interrupted or non-steady data flow and is therefore an appropriate device for writing to the removable medium; and
means for transmitting information to the computer in order for the device of the computer to write the information to the removable medium,
wherein the means for transmitting comprises:
means for transmitting the information from the network to the recordable medium without writing any of the information to an intermediate storage device when the means for determining determines that the device is an appropriate device for writing to the removable medium, and
means for transmitting the information to the computer in order for the intermediate storage device to store the information followed by reading the information from the intermediate storage device and writing the information to the removable medium using the device, when the means for determining determines that the device is not an appropriate device for writing to the removable medium.

58. A system according to claim 57, wherein said means for determining comprises:
means for determining whether the device is an appropriate device by examining state data of the device.

59. A system according to claim 58, wherein said means for determining comprises:
means for determining whether the device is an appropriate device by examining the state data of the device which includes at least a model number of the device.

60. A system according to claim 58, wherein said means for determining comprises:
means for determining whether the device is an appropriate device by examining the state data of the device which includes at least a manufacturer of the device.

61. A system according to claim 57, further comprising:
means for prohibiting the transmitting of the information to the computer, when the means for determining determines the device of the computer does not meet the predetermined criteria.

62. A system according to claim 57, further comprising:
means for determining if information is written to the removable medium; and the means for transmitting operates when it has been determined that no information is written to the removable medium.

63. A system according to claim 62, further comprising:
means for prohibiting a writing of information to the removable medium, when it has been determined that the removable medium contains previously written information.

64. A system according to claim 62, further comprising:
means for notifying a user that information is written to the removable medium.

65. A system according to claim 63, further comprising:
means for writing the information to a memory in the computer which is other than the removable medium, when it has been determined that the removable medium contains previously written information.

66. A system according to claim 57, wherein the means for transmitting comprises:
means for transmitting the information to the computer in order for the device of the computer which is an optical disc drive to write the information to the removable medium which is an optical disc.

67. A system according to claim 66, wherein the means for transmitting comprises:
means for transmitting the information to the computer in order for the device of the computer which is an optical disc drive to write the information to the removable medium which is one of a CD-R and a CD-RW.

68. A system according to claim 57, wherein the means for transmitting the information to the computer in order for the intermediate storage device to store the information comprises:
means for transmitting the information to the computer in order for the intermediate storage device which is a hard disk drive to store the information.

69. A system for recording information on a removable medium, comprising:
means for receiving information from a network by a computer;
means for writing information to the removable medium using a device of the computer having structure to write to the removable medium, only if it is determined that a device of the computer having structure to write to the removable medium has structure which makes the device an appropriate device for writing to the removable medium by having a capability to deal with an interrupted or non-steady data flow,
wherein the means for writing comprises:
means for writing the information received from the network to the removable medium using the device, without writing any of the information to an intermediate storage device when it is determined that the device is an appropriate device for writing to the removable medium, and
means for writing the information to the intermediate storage device followed by reading the information from the intermediate storage device and writing the information to the removable medium using the device, when it is determined that the device is not an appropriate device for writing to the removable medium.

70. A system according to claim 69, further comprising:
means for determining whether the device is an appropriate device by examining state data of the device.

71. A system according to claim 70, wherein said means for determining comprises:
means for determining whether the device is an appropriate device be examining the state data of the device which includes at least a model number of the device.

72. A system according to claim 70, wherein said means for determining comprises:
means for determining whether the device is an appropriate device by examining the state data of the device which includes at least a manufacturer of the device.

73. A system according to claim 70, wherein said means for determining is included in the computer which includes the device.

74. A system according to claim 70, wherein said means for determining is included in a remote computer which transmits the information to the computer which includes the device.

75. A system according to claim 70, further comprising:
means for prohibiting the writing of the information to the removable medium, when it is determined that the device is not an appropriate device for writing to the removable medium.

76. A system according to claim 75, wherein said means for prohibiting comprises:
prohibiting a downloading of the information from a remote computer, when the means for determining determines that the device is not an appropriate device for writing to the removable medium.

77. A system according to claim 69, further comprising:
means for determining if information is written to the removable medium; and
the means for writing the information to the removable medium operates when it has been determined that no information is written to the removable medium.

78. A system according to claim 77, further comprising:
means for prohibiting a writing of information to the removable medium, when it has been determined that the removable medium contains previously written information.

79. A system according to claim 77, further comprising:
means for notifying a user that information is written to the removable medium.

80. A system according to claim 78, further comprising:
means for writing the information to a memory in a computer which is other than the removable medium, when it has been determined that the removable medium contains previously written information.

81. A system according to claim 69, wherein the means for writing comprises:
means for writing the information to an optical disc.

82. A system according to claim 81 wherein the means for writing comprises:
means for writing the information to at least one of a CD-R and a CD-RW.

83. A system according to claim 69, wherein the means for writing the information to the intermediate device comprises:
means for writing the information to the intermediate device which is a hard disk drive.

84. A system of storing information, comprising:
means for receiving information from a network by a computer, the information including first importance information, and second importance information having an importance which is lower than the first importance information;
means for writing the first importance information to a hard disk drive of the computer;

means for writing the second importance information received from the network to a storage medium which is different from the hard disk drive, without writing any of the second importance information to the hard disk drive when a device configured to write to the storage medium does satisfy predetermined criteria including a capability to deal with an interrupted or non-steady data flow, wherein said means for writing the second importance information writes the second importance information to the hard disk drive, when the device configured to write to the storage medium does not satisfy predetermined criteria.

85. A system according to claim 84, further comprising:
means for requesting, by the computer, that the information be transmitted thereto.

86. A system according to claim 85, further comprising:
means for transmitting, to a remote computer over a network, state data of the device which writes to the storage medium.

87. A system according to claim 86, wherein the means for transmitting state data comprises:
means for transmitting the state data which includes a model number of the device.

88. A system according to claim 86, wherein the means for transmitting state data comprises:
means for transmitting the state data which includes a manufacturer of the device.

89. A system according to claim 84, further comprising:
means for determining information of the device configured to write to the storage medium,
wherein the means for writing the second importance information is only performed when the information of the device configured to write satisfies the predetermined criteria.

90. A system according to claim 84, wherein:
the means for writing the first importance information writes computer instructions; and
the means for writing the second importance information writes computer data.

91. A system according to claim 84, further comprising:
means for receiving a message from a remote computer indicating that a transmitting of information is prohibited, when the device configured to write to the storage medium does not satisfy predetermined criteria including at least one of a model number and a manufacturer.

92. A system according to claim 84, wherein:
said predetermined criteria includes at least one of a model number and a manufacturer.

93. A system according to claim 84, further comprising:
means for determining, before said means for writing the second importance information operates, that no information is recorded on the storage medium,
wherein said means for writing the second importance information operates when it is determined that no information is recorded on the storage medium.

94. A system according to claim 93, further comprising:
means for receiving a message from said server that said downloading operation is prohibited when the device which writes to said storage medium does not meet the predetermined criteria.

95. A system according to claim 84, further comprising:
means-for receiving-an indication-that-information is recorded on the storage medium, and
said means for writing the second importance information operates, even when the indication is received that information is recorded on the storage medium.

96. A system according to claim 95, further comprising:
means for providing, by a user, an instruction to operate the means for writing the second importance information, when there exists an indication that information is recorded on the storage medium.

97. A system according to claim 84, further comprising:
means for receiving an indication that information is recorded on the storage medium, and
means for writing the first and second importance information to the hard disk drive, when there is an indication that information is recorded on the storage medium.

98. A system according to claim 84, wherein the means for writing the second importance information comprises:
means for writing the second importance information to the storage medium which is one of a CD-R and a CD-RW.

99. A system of transmitting information, comprising:
means for receiving a request from a remote computer to download information over a network, the information including first importance information, and second importance information having an importance which is lower than the first importance information;
means for transmitting the first importance information to the remote computer so that the first importance information is stored to a hard disk drive of the computer;
means for transmitting the second importance information from the network to a storage medium of the remote computer which is different from the hard disk drive, without writing any of the second importance information to the hard disk drive when a device configured to write to the storage medium does satisfy predetermined criteria including a capability to deal with an interrupted or non-steady data flow,
wherein the storing of the second importance information stores the second importance information to the hard disk drive, when the device configured to write to the storage medium does not satisfy predetermined criteria including at least one of a model number and a manufacturer.

100. A system according to claim 99, further comprising:
means for receiving, from the remote computer, state data of the device which writes to the storage medium.

101. A system according to claim 100, wherein the means for receiving state data comprises:
means for receiving the state data which includes a model number of the device.

102. A system according to claim 100, wherein the means for receiving state data comprises:
means for receiving the state data which includes a manufacturer of the device.

103. A system according to claim 99, further comprising:
means for determining information of the device configured to write to the storage medium,
wherein the storing of the second importance information in the storage medium is only performed when the information of the device configured to write satisfies the predetermined criteria.

104. A system according to claim 99, wherein:
the means for transmitting the first importance information transmits the first importance information as computer instructions; and
the means for transmitting the second importance information transmits the second importance information as computer data.

105. A system according to claim 99, further comprising:
means for transmitting a message to the remote computer indicating that a transmitting of information is prohibited, when the device configured to write to the storage medium does not satisfy predetermined criteria including at least one of a model number and a manufacturer.

106. A system according to claim 99, wherein:
the predetermined criteria includes at least one of a model number and a manufacturer.

107. A system according to claim 99, further comprising:
means for determining, before storing the second importance information, that no information is recorded on the storage medium,
wherein the storing of the second importance information is performed when it is determined that no information is recorded on the storage medium.

108. A system according to claim 107, further comprising:
means for transmitting a message to the remote computer that said downloading operation is prohibited when the device which writes to said storage medium does not meet the predetermined criteria.

109. A system according to claim 99, further comprising:
means for receiving an indication that information is recorded on the storage medium,
wherein said storing of the second importance information is performed, even when the indication is received that information is recorded on the storage medium.

110. A system according to claim 109, further comprising:
means for receiving, from a user, an instruction to perform said storing of the second importance information, when there exists an indication that information is recorded on the storage medium.

111. A system according to claim 99, further comprising:
means for receiving an indication that information is recorded on the storage medium, and
means for storing the first and second importance information to the hard disk drive, when there is an indication that information is recorded on the storage medium.

112. A system according to claim 99, wherein the storing of the second importance information stores the second importance information to one of a CD-R and a CD-RW.

* * * * *